April 26, 1932.  A. T. KOPPE  1,855,356
PHOTO COMPOSING MACHINE
Filed Nov. 9, 1929  10 Sheets-Sheet 1
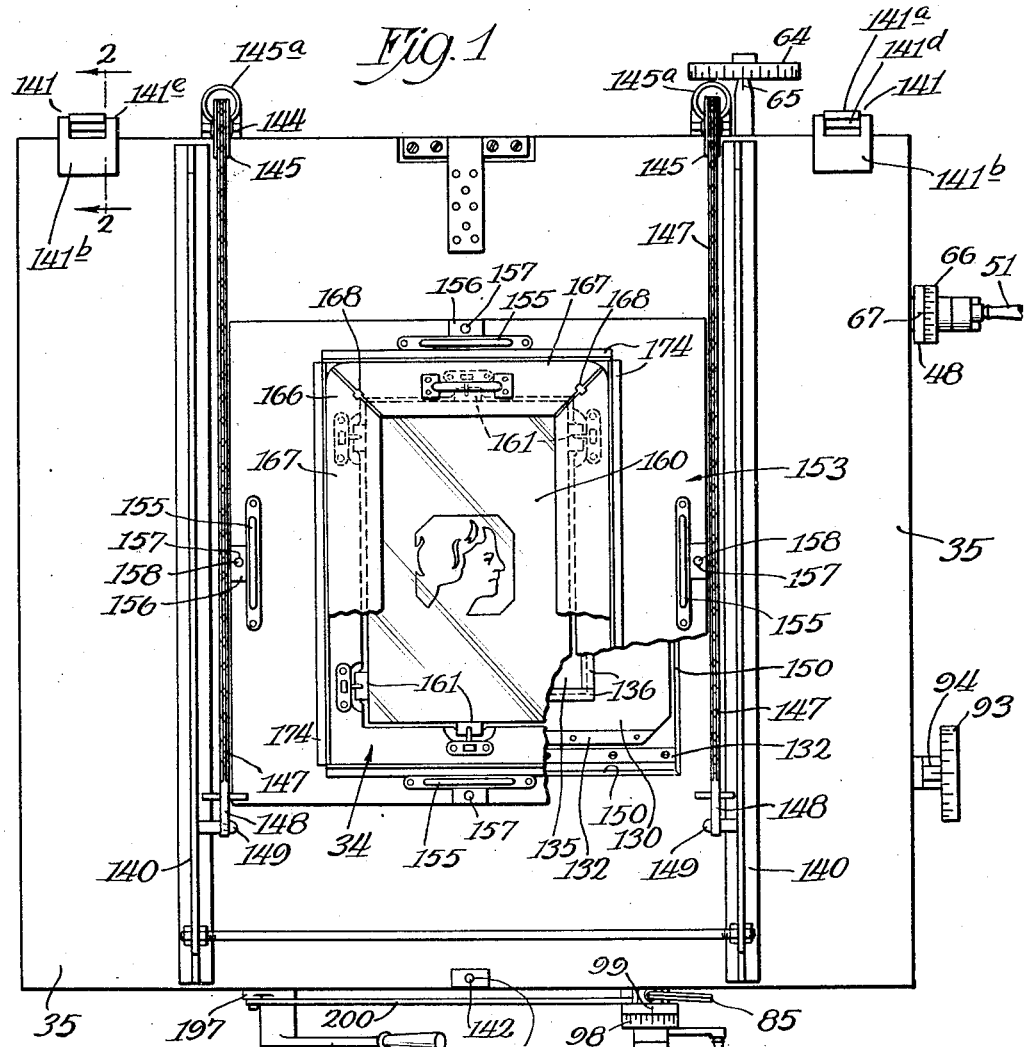
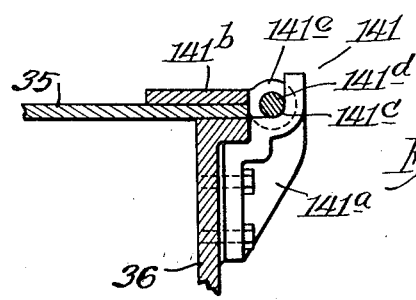
Inventor
Alexander T. Koppe
By Rector, Hibben, Davis & Macauley, Attys.

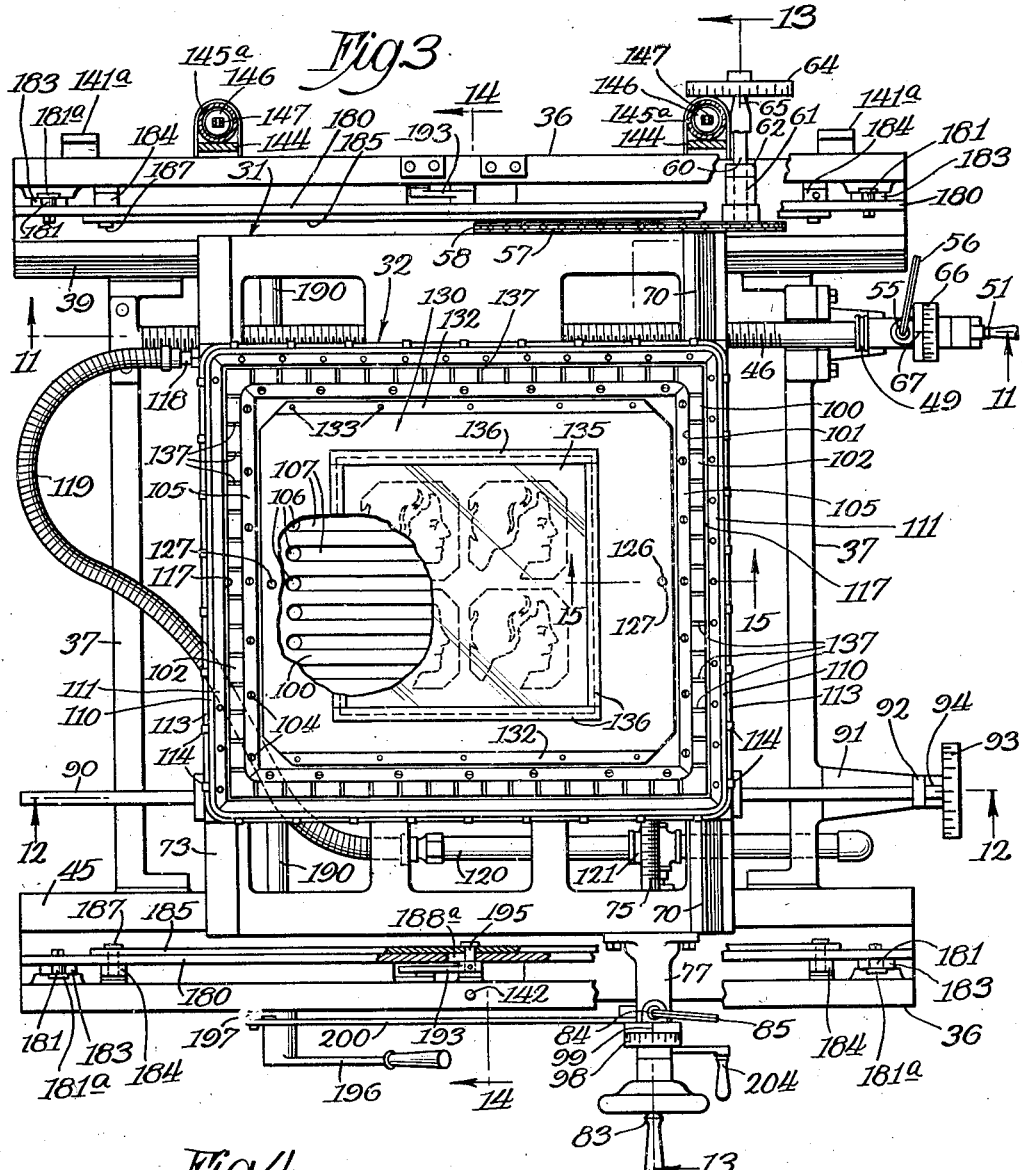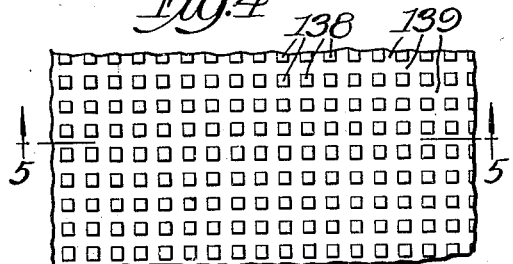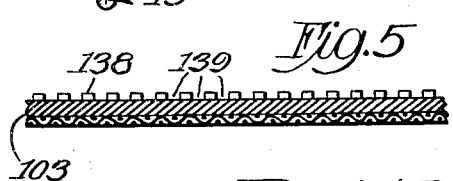

April 26, 1932.  A. T. KOPPE  1,855,356
PHOTO COMPOSING MACHINE
Filed Nov. 9, 1929  10 Sheets-Sheet 3
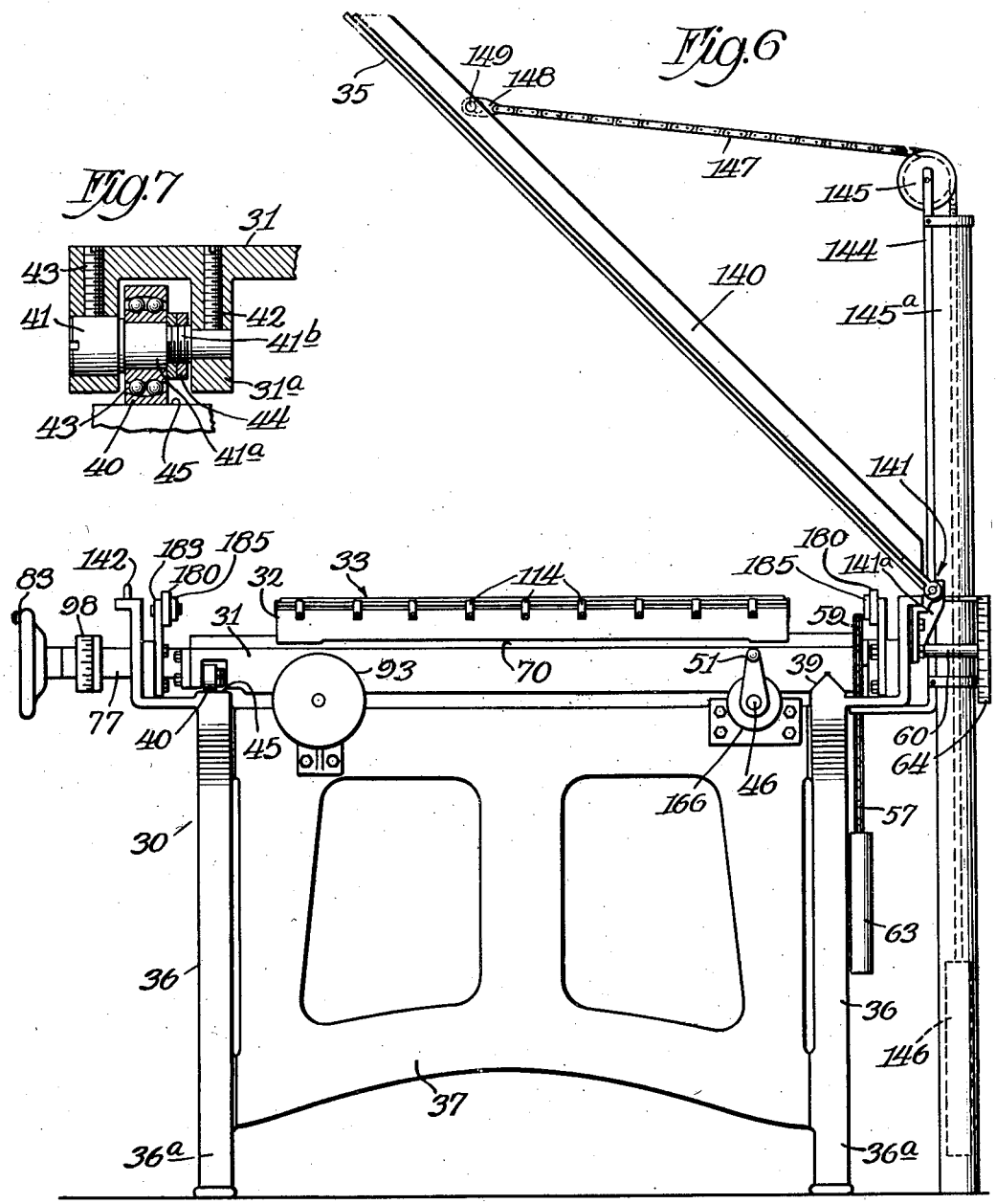

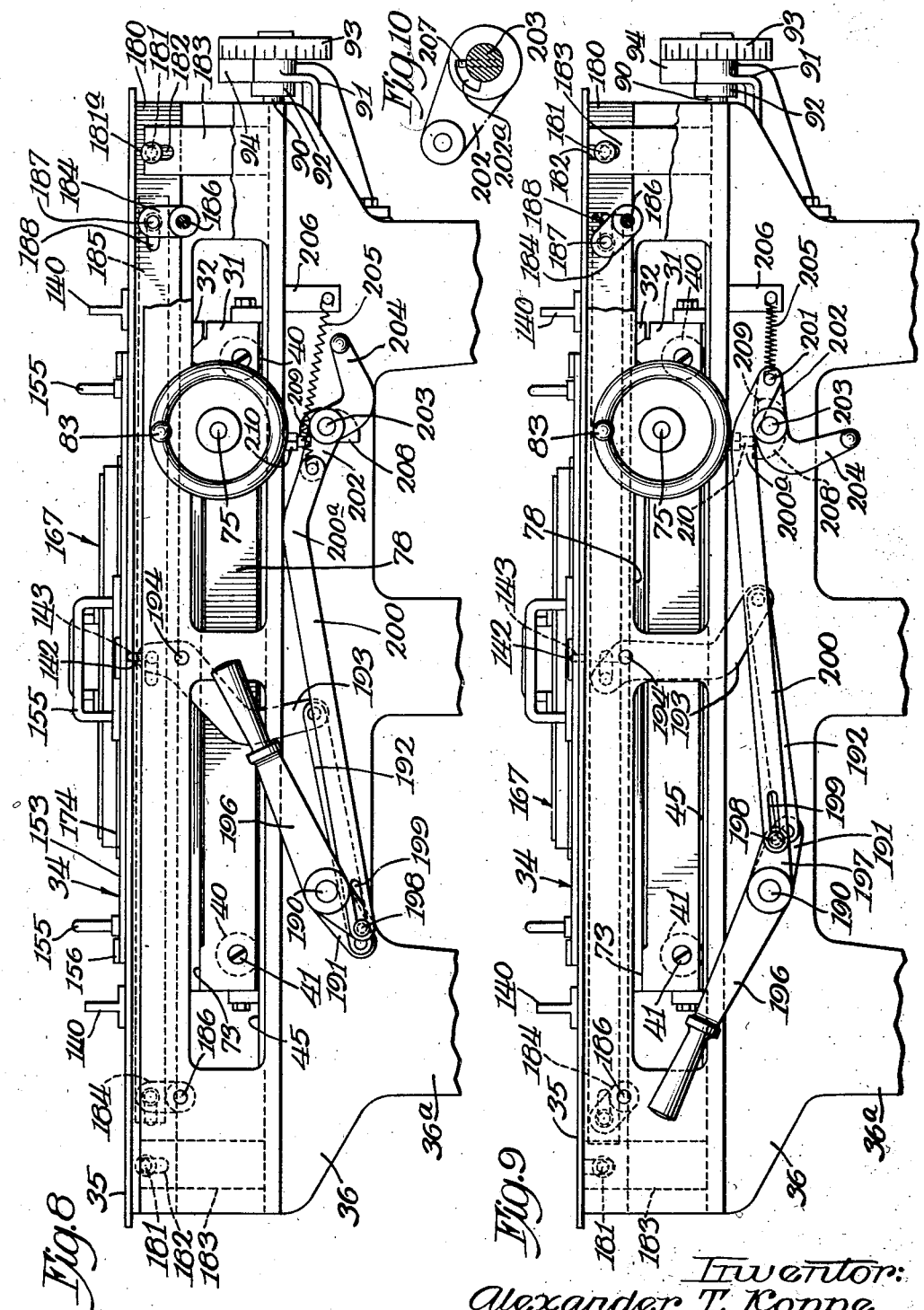

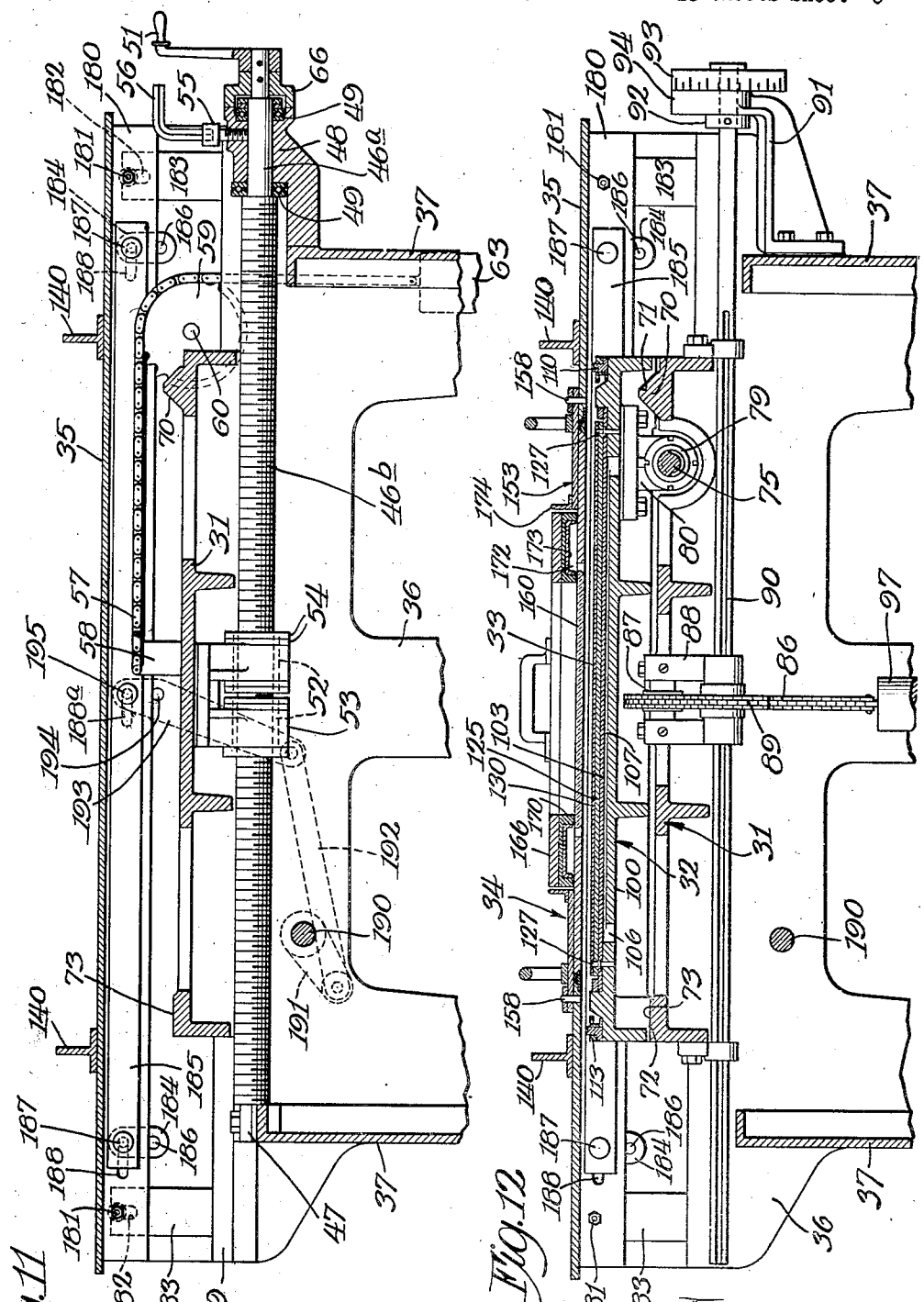

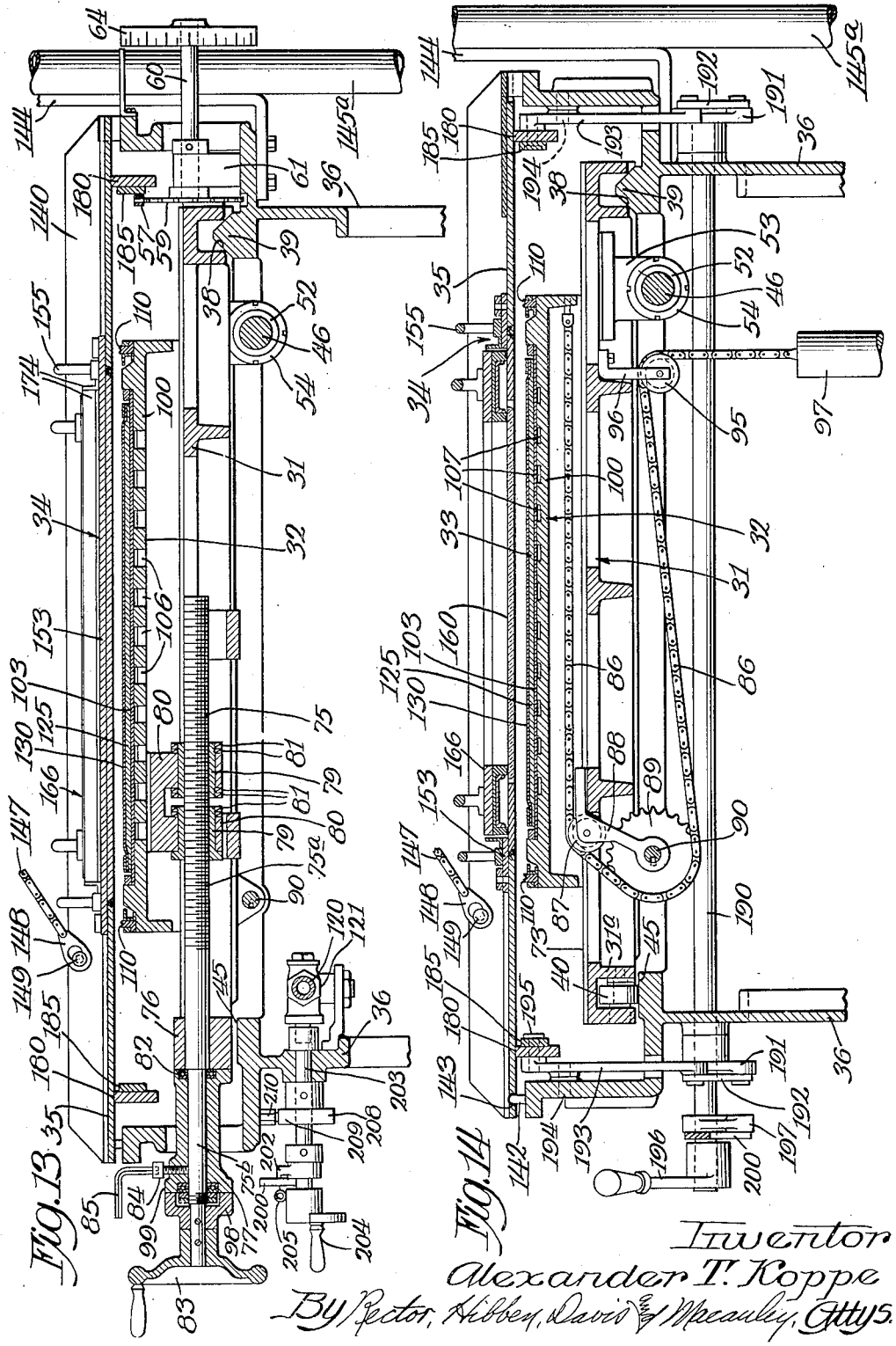

April 26, 1932. A. T. KOPPE 1,855,356
PHOTO COMPOSING MACHINE
Filed Nov. 9, 1929 10 Sheets-Sheet 7
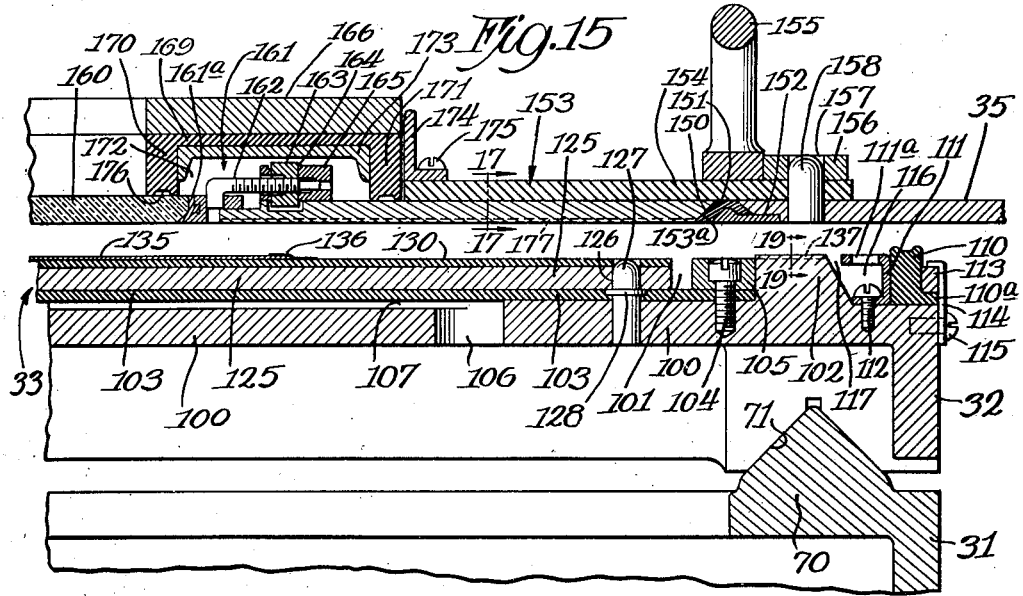
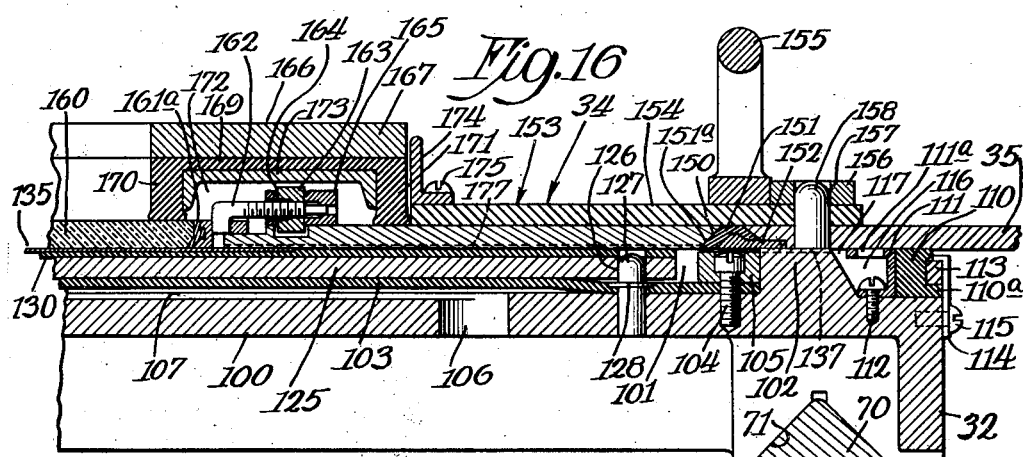
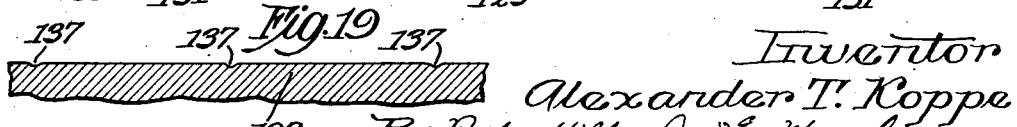

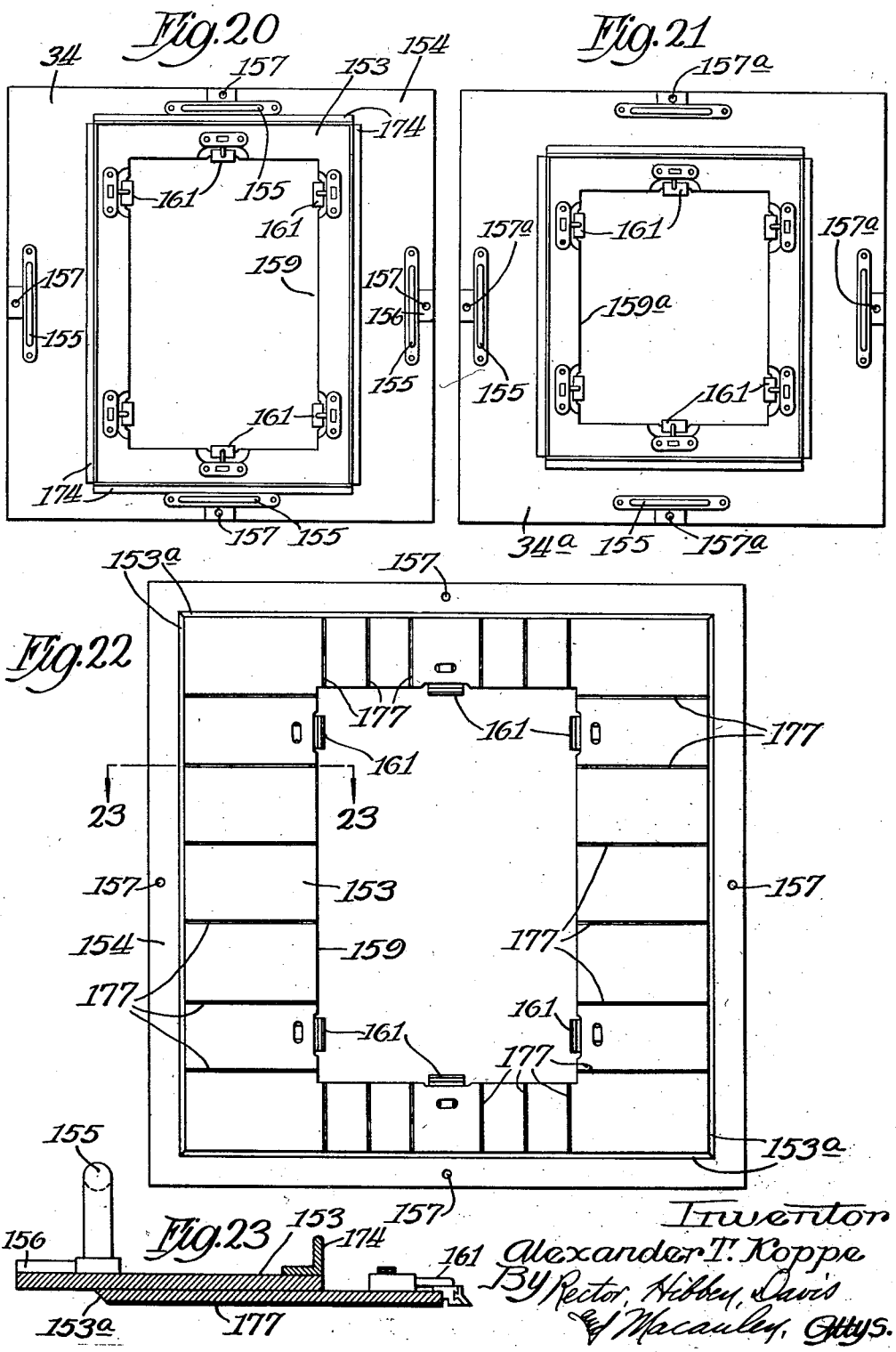

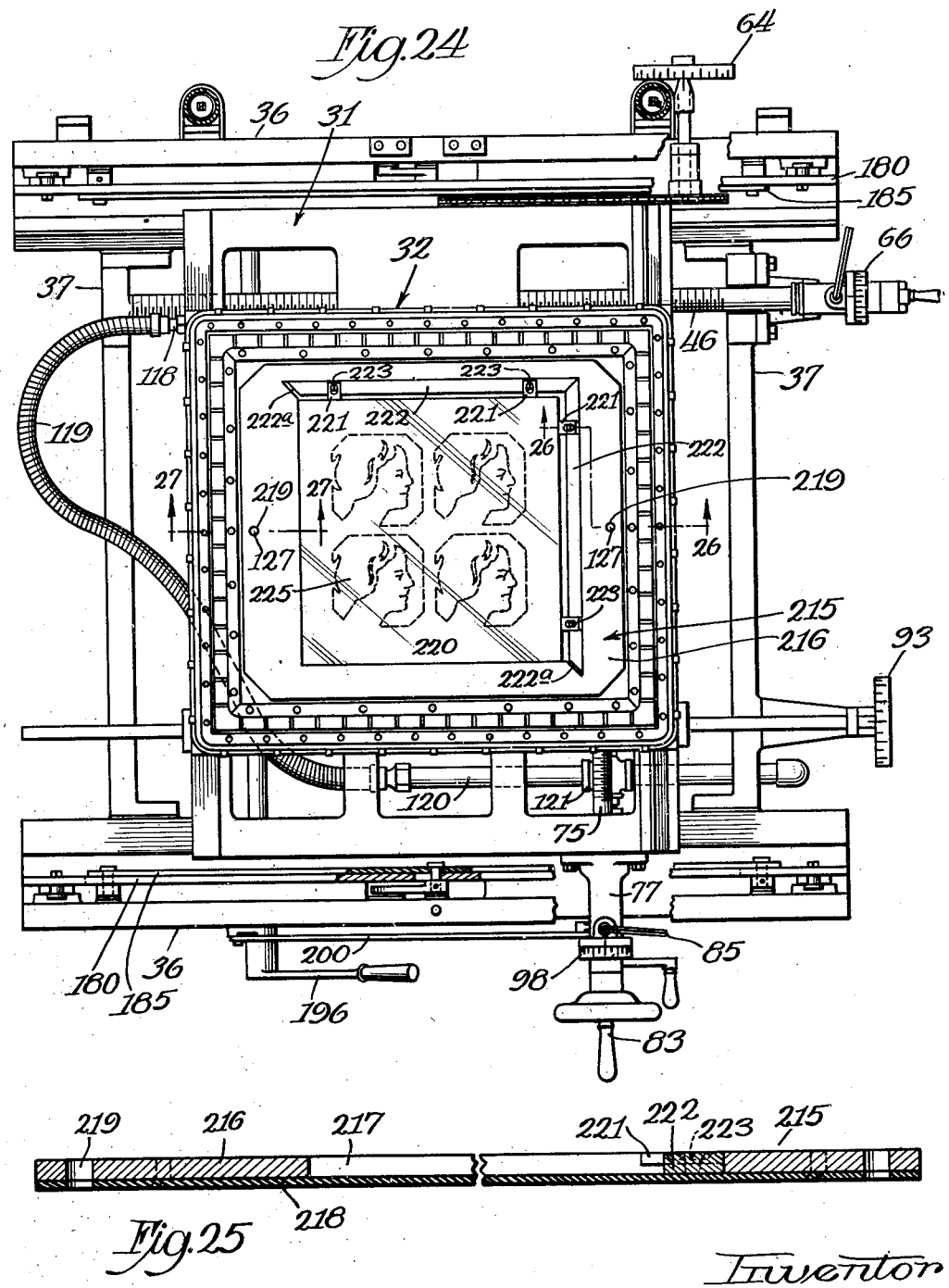

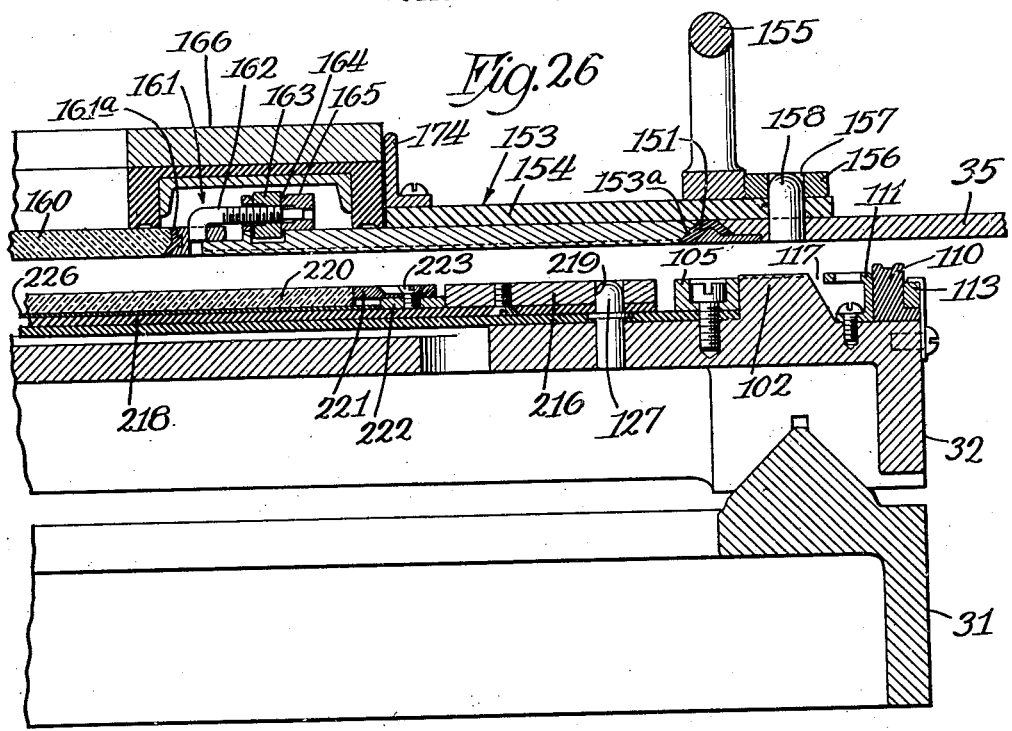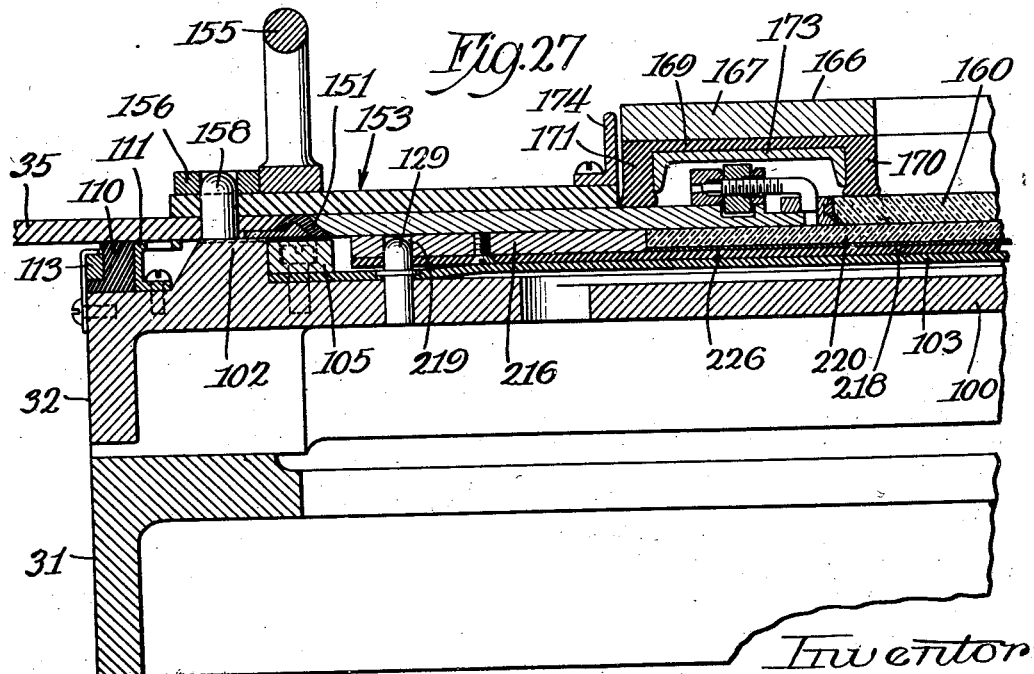

Patented Apr. 26, 1932

1,855,356

UNITED STATES PATENT OFFICE

ALEXANDER T. KOPPE, OF CHICAGO, ILLINOIS

PHOTO-COMPOSING MACHINE

Application filed November 9, 1929. Serial No. 406,085.

This invention relates to improvements in photo-composing machines and its purpose is to provide a machine which may be employed in the lithographic arts for photographically transferring images or designs carried by photographic negative or positive printing plates to sensitized metal press plates adapted for use in offset printing presses, or for transferring the images or designs carried by positive printing plates of glass or the like to sensitized plates of glass or other transparent material to produce photographic negatives each carrying one or a plurality of subjects in predetermined positions. The machine of the present invention may be used for reproducing upon sensitized metal press plates the images or designs which are to form the component parts of a completed multi-color printing job wherein one press plate is employed for printing each color and the machine may also be used for the manufacture of photographic negatives, each carrying one or more images or part-images which are to be reproduced upon the press plate.

The principal object of the invention is to provide an improved method and improved means for utilizing vacuum pressure by obtaining a close contact between the printing plate and the sensitized plate. My prior patent, Reissue No. 16,567, dated March 8, 1927, disclosed a photo-composing machine in which a close contact between the printing plate or negative and the sensitized plate is obtained by exhausting the air from the region between two plates and thereby causing the pressure of the atmosphere acting on the outer surfaces of the plates to force them together. The present invention is distinguished from that of my prior patent in that one of the plates is enclosed entirely within the vacuum chamber while the other plate forms a portion of one wall of the chamber and has some freedom of movement with respect to the opposite flexible wall of the chamber so that atmospheric pressure acting on opposite sides of the chamber forces the two plates together to obtain a more perfect contact than has heretofore been possible, whereas in the structure of my prior patent, the two plates formed portions of opposite walls of the vacuum chamber without either plate being itself enclosed within said chamber so that the freedom of movement of these plates under the influence of atmospheric pressure was somewhat restricted, particularly when operating upon an intermediate portion of the sensitized plate, so that the contact between the sensitized plate and the printing plate or negative, while sufficient for all ordinary photo-composing purposes, did not result in the same close contact as that obtained by the present invention and could not produce the same accuracy of detail in reproduction on the sensitized surface as that which follows from the use of the present invention. In the use of vacuum pressure printing frames, such as those disclosed in the Soltmann Patent No. 654,421, dated July 24, 1900, and the McCaslin Patent No. 683,059, dated September 24, 1901, it has been possible to obtain contact between a printing plate or negative film and a sensitized sheet by means of vacuum pressure with both of the contacting sheets or plates enclosed within a vacuum chamber but those printing frames have been adapted for use in reproducing a single image only on one sensitized sheet and have not been capable of use for reproducing a number of images or designs in predetermined positions over the surface of a relatively large sensitized sheet. The present invention obtains the advantage of having at least one of the contacting plates enclosed entirely within the vacuum chamber in combination with means for effecting relative adjustment of the printing plate and the sensitized plate so that a large number of images may be reproduced in predetermined positions over the surface of the sensitized plate with great accuracy and without disturbing the high degree of vacuum which may be obtained in the chamber in which the sheet or plate is enclosed.

By reason of the high degree of pressure which is obtained by the present invention and the minute contact which is brought about between the plates over all portions of their areas, it is possible to use the photocomposing machine of the present invention for the manufacture of photographic negatives, intended for use in the same or other photo-composing machines, by exposing the photographic positive in direct contact with the sensitized plate upon which the negative impressions are to be reproduced, thus avoiding the necessity of using projection cameras for this purpose and greatly reducing the cost of preparing photographic negatives carrying either one or a plurality of subjects thereon.

One of the objects of the present invention is to provide means for facilitating the withdrawal of the air from the region between the printing plate and the sensitize plate and other surrounding contacting portions of the vacuum chamber so that a more perfect and uniform contact is obtainable between the two plates than has heretofore been possible. Still another object is to provide a photo-composing machine having means for obtaining a close contact between the printing plate and the sensitized plate by vacuum pressure with the sensitized plate entirely enclosed within the vacuum chamber and engaged on its outer or rear side by a flexible rubber blanket or the like which is acted upon directly by atmospheric pressure so that each unit of area of the sensitized plate is forced by atmospheric pressure toward the printing plate or negative to obtain a uniform contact over each unit of area. A further object is to provide improved means for facilitating the access of atmospheric pressure to the under or outer side of the rubber blanket which constitutes one wall of the vacuum chamber so that uniform atmospheric pressure acts on all portions of the blanket beneath or behind the sensitized plate to force it toward the printing plate or negative in opposition to the atmospheric pressure acting on the upper or outer side of the printing plate or negative. A further object of the invention is to provide a photo-composing machine having a flat cover plate having an opening within which the printing plate or negative is mounted and arranged to engage a sealing member mounted on the carrier for the sensitized plate to form a chamber from which the air may be withdrawn. A further object is to provide a photo-composing machine having a cover plate adapted to have a sealing engagement with the carrier for the sensitized plate and having an opening within which any one of a plurality of negative carriers may be mounted, said negative carriers being adapted to hold negatives of a plurality of different sizes. Another object of the invention is to provide a photo-composing machine having a sensitized plate carrier comprising an outer frame having mounted therein a flexible blanket adapted to form one wall of the vacuum chamber and arranged to engage a holder or tray which is movably mounted in predetermined position in the chamber and which has secured thereon the sensitized plate or sheet upon which the subject is to be reproduced by photographic means. A further object of the invention is to provide an outer cover plate movable toward and from its operative position and having an opening therein in which the negative frame or carrier is positioned, in combination with a pair of rightangularly movable supports positioned opposite to the operative position of the cover plate and arranged to support the carrier for the sensitized plate so that various portions of the sensitized plate may be positioned accurately opposite the image-carrying portion of the negative or printing plate. Other objects relate to various features of construction and arrangement which will appear more fully hereinafter.

The nature of the invention will be understood from the following specification taken with the accompanying drawings, in which one embodiment is illustrated. In the drawings, Fig. 1 shows a top plan view of the improved photo-composing machine with the top plate or cover plate thereon in its horizontal operative position;

Fig. 2 shows an enlarged detail section taken on the line 2—2 of Fig. 1;

Fig. 3 shows a top plan view of the machine with the cover plate thereof removed, thereby revealing a carrier for the sensitized plate and the means by which this carrier is adjusted along two right angular paths to position various portions of the sensitized plate opposite the image-carrying portion of the printing plate which is mounted on the cover plate;

Fig. 4 shows an enlarged plan view of a portion of the rubber blanket which is preferably employed as the lower wall of the vacuum chamber and also on the tray which carries the sensitized plate;

Fig. 5 shows a large detail section taken on the line 5—5 of Fig. 4;

Fig. 6 shows an enlarged side elevation of the improved photo-composing machine with the cover plate tilted upwardly to its inoperative position;

Fig. 7 shows an enlarged vertical section through one of the rollers which support the forward portion of the lower table upon which the sensitized plate carrier is indirectly mounted;

Fig. 8 shows an enlarged front elevation of the improved machine with the lower part of the frame broken away and with the cover plate elevated out of engagement with the sealing member which forms a part of the sensitized plate carrier;

Fig. 9 is a front elevation of the machine, similar to that of Fig. 8, showing the cover plate lowered into engagement with the sealing member of the sensitized plate carrier;

Fig. 10 is a detail section showing the lost motion connection between the operating shaft for the vacuum valve and the crank arm through which a safety connection is established with the means for raising and lowering the cover plate;

Fig. 11 shows an enlarged vertical section taken on the line 11—11 of Fig. 3;

Fig. 12 shows an enlarged vertical section taken on the line 12—12 of Fig. 3;

Fig. 13 shows an enlarged vertical section on the line 13—13 of Fig. 3;

Fig. 14 is an enlarged vertical section taken on the line 14—14 of Fig. 3;

Fig. 15 shows an enlarged vertical section taken on the line 15—15 of Fig. 3, showing the arrangement of the parts when the cover plate is elevated above the sensitized plate carrier;

Fig. 16 is a sectional view similar to that of Fig. 15, showing the arrangement of the parts when the cover plate has been lowered into sealing engagement with the sealing member of the sensitized plate carrier and a communication with a source of suction established so that a vacuum is created in the vacuum chamber and the sensitized plate and negative forced into close contact;

Fig. 17 is a detail section taken on the line 17—17 of Fig. 15, showing the grooves in the under side of the cover plate which facilitate the exhaustion of the air from the region between the negative and the underlying portion of the sensitized plate;

Fig. 18 is a side elevation, partially in section, of the tray upon which the sensitized metal press plate is adapted to be mounted in the manner illustrated in Figs. 3 and 15;

Fig. 19 is a detail vertical section taken on the line 19—19 of Fig. 15, showing the grooves in the upper surface of the outer portion of the sensitized plate carrier which facilitate the passage of air from the recessed area occupied by the sensitized plate carrying tray to the air channel which is formed in the outer portion of the sensitized plate carrier;

Fig. 20 shows a top plan view of one of the negative carrying frames adapted for use with the present invention and arranged to carry a negative of a particular size;

Fig. 21 shows a top plan view, similar to that of Fig. 20, of another negative carrying frame of the same external dimensions, adapted to carry a negative or printing plate of another size;

Fig. 22 shows a bottom plan view of the negative carrying frame illustrated in Fig. 20;

Fig. 23 shows an enlarged vertical section taken on the line 23—23 of Fig. 22, with the frame in its upright position;

Fig. 24 shows a top plan view similar to that of Fig. 3 with the cover plate of the machine removed and with the sensitized plate carrying frame equipped with a tray adapted to support a sensitized glass plate when the machine is being employed for the manufacture of negative plates;

Fig. 25 shows an enlarged vertical section through the form of tray which is employed for carrying a glass plate when making negatives;

Fig. 26 shows an enlarged vertical section taken on the line 26—26 of Fig. 24, and Fig. 27 shows an enlarged vertical section taken on the line 27—27 of Fig. 24.

As illustrated in the accompanying drawings, the invention is embodied in a machine comprising a supporting frame 30 adapted to rest upon a floor or other foundation and carrying a lower carriage or supporting member 31 which is movable in one direction on the frame and which in turn supports an upper carrier or supporting member 32 movable on the member 31 in a direction at right angles to the movement of the member 31 on the frame 30. The upper carrier or supporting member 32 supports the sensitized plate holder 33 which is adapted to cooperate with the negative carrier 34 mounted on the top cover plate 35. This cover plate is hinged on one side of the frame 30 so that it may swing upwardly to the position shown in Fig. 6 and when it is lowered to the horizontal position shown in Figs. 1 and 9, it is adapted to cooperate with a sealing flange of the sensitized plate carrier 32 to form a vacuum chamber from which the air may be withdrawn by suction to cause the printing plate and the sensitized plate to be forced into close contact by the action of atmospheric pressure. When the cover plate 35 is in its horizontal position, it may be raised to a limited extent to permit relative adjustment beneath it of the supporting members 31 and 32 so that different portions of the sensitized plate may be positioned beneath that part of the printing plate which carries the image to be reproduced.

The frame 30 comprises longitudinal side frame members 36 extending longitudinally of the machine at the front and rear sides thereof and having depending legs 36ª which engage the floor or other support. The side frames 36 are connected at their ends by the end frame members 37, thus providing a rigid support for the movable parts of the machine. The lower supporting member 31 is provided on its under side along its rear edge with a V-shaped groove 38 which is adapted to travel on the V-shaped guide 39 formed on the rear side frame member 36, as shown in Figs. 6, 13 and 14. Along its forward edge, the supporting member or carriage 31 is provided with a pair of rollers 40 which are mounted on shafts 41 secured in flanges 31ª of the carriage and secured therein by set screws 42, as shown in Fig. 7. A roller bearing 43 is mounted within the roller 40 on the central reduced portion 41ª of each shaft and the central ring of this roller bearing is held in place by a pair of nuts 44 which engage the threaded part 41ᵇ of the shaft. The V-shaped guide at the rear side of the carriage 32 maintains it in proper alignment on the frame and the rollers 40 which travel on a longitudinal flat surface 45, formed on the forward frame member 36, permit some movement of the carriage 31 transversely of the machine due to changes in temperature or other causes. The supporting carriage 31 is adjustable longitudinally of the machine by means of a screw threaded shaft 46 which has one end journaled in a bearing 47 carried by one of the end frame members 37 and which has the reduced portion 46ª at the other end thereof journaled in a bearing 48 carried by the other end frame member 37, as shown particularly in Fig. 11. Roller thrust bearings 49 are mounted on the portion 46ª of the shaft at each end of the bearing 48 and the projecting end of the shaft has a fixed crank handle 51 by which the shaft may be turned to effect adjustment of the table 31 through engagement of the threads 46ᵇ of the shaft with sleeves 52 which are secured within the bearing members 53 secured to the under side of the carriage 31 and extending downwardly from the middle portion thereof. The threaded sleeves 52 are secured in adjusted position within the bearing members 53 by lock nuts 54 mounted on their outer ends and by suitably adjusting these sleeves toward each other, all lost motion between the threads of the shaft 46 and the carriage 31 may be taken up so that each turn or partial turn of the shaft will produce a predetermined linear movement of the carriage longitudinally of the machine. When the carriage has been adjusted to the desired extent, it may be secured in position by a set screw 55 which engages the upper side of the bearing 48 and the part 46ª of the shaft and which may be operated by a removable handle 56. For the purpose of indicating the position occupied by the carriage 31, a sprocket chain 57 is secured to a part 58 carried by the rear side of the carriage 31 and this chain meshes with a sprocket wheel 59 secured on a shaft 60 which is journaled in a bearing 61 carried by the rear longitudinal frame member 36 and held against longitudinal movement therein by a collar 62 located on the opposite side of the bearing from the sprocket wheel, as shown in Figs. 3 and 11. A weight 63 is attached to the end of the chain 57 beneath the sprocket wheel so that upon movement of the carriage 31, a corresponding rotation of the sprocket wheel 59 on the shaft 60 is effected. Upon the outer end of the shaft 60 there is mounted an indicating wheel 64 having graduations which move in proximity to a stationary index mark 65 so that the position of the carriage may be determined by referring to the graduation which is positioned opposite the index mark or pointer. The approximate position of the carriage 31 may be determined by this means and a more accurate determination may be made by reference to a micrometer disk 66 which is secured on the end of the shaft 46 adjacent the crank handle 50 which has its graduations arranged to move in proximity to an index mark 67 located on the upper side of the bearing 48. The movements of the carriage 31 effected by partial revolutions of the crank handle 50 may be determined by reference to the micrometer disk 66 and the mark 67.

The upper supporting member or carrier 32 is supported on the lower member 31 by means of a V-shaped guide 70 which is formed along one side of the carriage 31 and arranged to coact with corresponding V-shaped grooves 71 formed in the under side of the member 32, as shown particularly in Figs. 12, 15 and 16. Along its opposite edge, the carrier 32 is provided with flat surfaces 72 which coact with flat surfaces 73 formed on the carriage 31 so that some movement of the carrier 32 on the carriage 31 may take place, transversely to the guide 70, in order to allow for expansion and contraction. The carrier 32 is moved transversely of the machine on the carriage 31 by means of a screw threaded shaft 75, shown in Fig. 13, which is journaled in a bearing 76 carried by the carriage 31 and also a sleeve-like bearing bracket 77 which is secured to the carriage 31 and arranged to project forwardly therefrom through an opening 78 formed in the side frame member 36. The threaded portion 75ª of this shaft engages internally threaded sleeves 79 which are secured within bearing members 80 attached to the under side of the carrier 32. The sleeves 79 are held against rotation within the bearing members 80 and are adjustable longitudinally therein by lock nuts 81 which engage their outer threaded extremities, so that all lost motion between the bearing members 80 and the shaft 75 may be taken up to cause a positive movement of the carrier 32 upon rotation of the shaft 75. Roller thrust bearings 82 are mounted in recesses in the bearing sleeve 77 at opposite ends of the reduced portion 75ᵇ of the shaft 75 and the outer end of the shaft 75 has a crank handle 83 secured thereon so that the shaft may be manually rotated to effect adjustment of the carrier 32 transversely of the machine. When the carrier has been moved to the desired position, it may be secured by a set screw 84 which passes through the bearing sleeve 77 to engage the part 75ᵇ of the shaft, and which may be operated by a removable crank handle 85. For the purpose of indicating the position of the carrier 32 on the carriage 31, a sprocket chain 86 is secured to the under side of the carrier 32 at its rear edge, as shown in Fig. 14, and is then extended forwardly around the pulley 87 carried by a bracket 88 which is attached to the carriage 31. After passing over the pulley 87, the sprocket chain 86 extends downwardly around the sprocket wheel 89 which is splined on a shaft 90. This shaft is journaled in the bracket 88 and another similar bracket carried by the carriage 31 and the end thereof at the righthand side of the machine is journaled in a bearing bracket 91. A collar 92 is secured to the shaft 90 at one side of the bracket 91 and at the other side thereof a micrometer or index wheel 93 is secured on the shaft and arranged to have its graduations move adjacent to the index mark on a pointer 94 which extends upwardly from the bracket 91. The sprocket chain 86, after passing around the sprocket wheel 89, extends toward the rear of the machine and around another pulley 95 which is rotatably mounted in a bracket 96 depending from the table 31. The chain extends downwardly from the pulley 95 and has a weight 97 secured thereto so that upon movement of the carrier 32 transversely of the machine, the weight 97 and chain 86 effect a corresponding rotation of the shaft 90. Due to the splined connection of the shaft 90 with the sprocket gear 89, the carriage 31 is permitted to move longitudinally of the machine while retaining the connection of the carrier 32 with its indicating means. When a longitudinal movement of the carriage 31 takes place, the projecting portion of the shaft 75 for adjusting the carrier 32, moves longitudinally in the slot 78 which is formed in the front frame member 36. In addition to the index or micrometer wheel 93 and pointer 94 which give the approximate position of the upper supporting carrier 32, the shaft 75 is provided with a micrometer disk 98 having graduations which move in proximity to an index mark 99 on the bearing sleeve 77 so that movements corresponding to fractional degrees of rotation of the shaft 75 are indicated by the pointer 99.

The upper supporting member or carrier 32 comprises a flat horizontal plate 100 which constitutes in effect the carrier for the sensitized plate which is mounted thereon through the intermediate movable tray or holder 33 hereinafter described. The plate 100 is provided with a central rectangular depression 101 surrounded by an annular rectangular rib or flange 102. In the bottom of the depression 101 there is located a flexible rubber blanket 103 which is seated on the upper flat surface of the plate and secured thereto by screws 104 passing through bars 105 and into the plate through the blanket, as shown particularly in Figs. 15 and 16. The blanket 103 is adapted to form the lower wall of the vacuum chamber in which a close contact is effected between the sensitized plate and the printing plate and, in order that the atmospheric pressure may act directly on the under side of this blanket, that portion of the plate 100 which constitutes the bottom wall of the depression 101, is provided with two parallel rows of apertures 106 extending downwardly therethrough with the oppositely located apertures in opposite rows connected by grooves 107 formed in the upper surface of the plate 100, thus allowing free access of the atmospheric air to the under side of the blanket. Around the outer side of the rib 102, there is mounted a continuous sealing member 110 formed of rubber or other similar material which seats against the channel-shaped member 111 secured to the carrier by screws 112 and which is secured in place by retaining bars 113 and clips 114. The clips engage the outer sides of the bars 113 and the lower flange 110$^a$ of the sealing member and are secured to the outer side of the carrier or table by screws 115. The space between the sealing member 110 and the rib or flange 102 constitutes a suction channel 116 through which the air is withdrawn from the region between the carrier and the top plate 35. In order to permit access to this air channel of the air which is confined within the sealing member 110, the upper flange of the channel 111 is provided with a series of apertures 111$^a$ and the edge thereof is spaced from the rib 102, as shown at 117. The air is exhausted through the air channel 116 through a connection which is established through a pipe 118 extending through one wall of the channel, as shown in Fig. 3, and connected with a flexible conduit 119 which leads to an exhaust pipe 120 mounted on the frame of the machine and connected with a suction pump. A valve 121 is mounted in the pipe 120 to control the connection of the pipe 118 with the source of suction and the flexible conduit 119 is of such length that it will accommodate itself to the necessary longitudinal and transverse movements of the sensitized plate carrier.

Mounted within the depression 101 of the sensitized plate carrier, there is located a base plate or tray 125 which forms the sensitized plate holder 33 and is in the form of a flat metal plate resting on the blanket 103 and having a pair of oppositely disposed dowel holes 126 therein detachably engaged by the upper rounded extremities of the dowel pins 127 which are fixed in the plate 100 and arranged to project upwardly through the blanket 103 with washers 128 secured thereon in contact with the upper surface of the blanket. These dowel pins 127 locate the tray or holder 125 in definite position within the carrier or support 32 and at the same time permit free upward movement of the tray under the influence of the atmosphere acting on the under side of the blanket 103 without disengaging the tray from the dowel pins.

Upon the upper side of the plate 125, there is mounted another rubber blanket 130, of the same area as the plate, which has two opposite edges engaging depressions 131 in the plate 125 where they are secured in place by clamping plates 132 engaged by screws 133 passing upwardly through the plate 125 and through the blanket, as shown in Fig. 18. The upper surfaces of the bars 132 lie flush with or below the upper surface of the blanket 130 so that a sensitized plate placed on the blanket 130 will be permitted to contact freely and uniformly with a printing plate or negative positioned above it. The sensitized plate 135 is laid on the upper surface of the blanket 130 and is secured thereto by thin strips of adhesive tape 136 which overlap the outer edge of the plate and adhere both to the plate and the blanket, as shown in Figs. 1, 3 and 15. The sensitized plate may be secured to the tray 125 when it is out of the machine, and then when the tray is dropped into place on the carrier with the dowel pins 127 engaging the holes 126, the parts are in readiness for the top plate 35 to be lowered in order to position the negative or printing plate opposite the sensitized plate 135, which may be a zinc press plate adapted for use in an offset printing press. In order to facilitate the passage of air from the region between the press plate and the negative to the air channel 116, the upper surfaces of the rectangular rib or flange 102 is preferably provided with a number of outwardly extending grooves 137, as shown particularly in Figs. 3, 15 and 19, and in order that the air may be exhausted readily from the region beneath the tray 125 and beneath the press plate, one or both of the blankets 103 and 130 may be formed of rubber fabric having a roughened upper surface such as that shown in Figs. 4 and 5, where the blanket is illustrated as being provided with a lower reenforcing layer of fabric on which is carried a layer of rubber having a number of upwardly extending rectangular projections 138 formed thereon and arranged in rows, leaving intervening intersecting air channels 139 throughout the upper area of the blanket so that the air is permitted to pass through these channels beneath the plate positioned thereon.

The top cover plate 35 is reenforced on its upper side by a pair of T-iron members 140 which extend parallel to each other from the front to the rear of the cover and are secured to the plate proper by welding or other suitable means. At its rear edge, the cover plate is secured to the frame 30 by hinges 141 each of which comprises a bracket 141ᵃ secured to the frame and another bracket 141ᵇ secured to the cover plate. The bracket 141ᵃ of each hinge is provided with a rightangular bearing seat 141ᶜ engaged by a trunnion 141ᵈ which projects between the opposite ears 141ᵉ of the complementary bracket 141ᵇ. The trunnions 141ᵈ rest normally on the seats 141ᶜ and are adapted to pivot thereon when the cover plate 35 is tilted upwardly to the position shown in Fig. 6, but this construction also permits the cover plate 35 to be moved bodily in an upright direction when it is occupying a horizontal position. The ears 141ᵉ engage the sides of the bracket 141ᵃ to position the cover plate accurately on the frame. The cover plate is further accurately positioned when in a horizontal position by a dowel pin 142 secured to the frame and extending upwardly through a dowel hole 143 formed in the cover plate. The pin 142, like the bearing seats 141ᶜ, is of sufficient length to permit a limited up and down movement of the cover plate without disengagement therefrom. A pair of bars 144 are secured to the rear side of the frame 30 and extend upwardly therefrom, being provided with pulleys 145 rotatably mounted at their upper ends. The bars 144 carry channels 145ᵃ in which counterweights 146 are located and these counterweights are connected with chains 147 which extend upwardly around the pulleys 145 and are provided at their ends with eyelets 148 detachably engaging pins 149 projecting laterally from the vertical flanges of the T-bars 140. When the chains 147 are thus attached to the cover plate, the counterweights 146 facilitate the movement of the cover plate to and from the inclined position shown in Fig. 6 and when the cover plate is in its horizontal operative position, the chains 147 may be detached therefrom so that the limited vertical movements of the cover plate 35 which are brought about to permit relative adjustment of the printing plate and the sensitized plate, are not affected by the counterweights 146.

The cover plate 135 is provided, between the bars 140, with a centrally located rectangular opening 150 which is adapted to be fitted by the printing plate holder 34 previously referred to. The opening 150 is bounded around its edges by a sealing flange or gasket 151 of rectangular outline which is secured in place by a clamping plate 152 and which has an inner downwardly and inwardly inclined surface 151ᵃ adapted to engage a correspondingly inclined surface around the outer edge of the holder 34. The holder 34 comprises a flat metal plate 153 having a rectangular inclined edge surface 153ᵃ to engage the sealing flange or gasket 151 and it is provided with a reenforcing frame member or extension 154 of rectangular outline which is secured on the upper surface thereof and projects outwardly beyond the edge of the plate 153 when the holder 34 is in place on the cover plate 35, as shown in Fig. 15. The extension plate 154 is provided with four handles 155 which are arranged opposite each other in pairs so that they may be engaged by the hands of the operator to permit the holder to be placed on the cover plate and removed. On the outer sides of these handles, small plates 156 are secured to the upper side of the extension plate 154 and dowel holes 157 are formed through these plates 156 and the underlying portions of the plate 154 to be engaged by dowel pins 158 which are rounded at their upper ends to permit them to engage the dowel holes readily and which have a sufficiently accurate fit in the dowel holes to locate the holder 34 accurately in position on the cover plate 35. The holder 34 is square and the holes 157 of each pair are spaced apart the same distance as the holes of the other pair so that the holder 34 may be turned through an angle of ninety degrees and again placed in position on the cover plate 35 with the other set of holes 157 engaging the dowel pins 158.

The plate 153 of the negative holder is provided with a central rectangular opening 159 adapted to be engaged by the printing plate 160 which may be either a photographic negative or positive and which is illustrated in the drawings as being a glass plate carrying the image or design to be reproduced on its under surface. The printing plate 160 is held in adjusted position in the holder 34 by means of clamps 161 which engage the edges of the printing plate and which carry screw threaded adjusting members 162 adapted to be operated by knurled nuts 163 which are positioned in openings 164 formed in blocks 165 secured to the upper surface of the plate 153 and having the adjusting members 162 slidably mounted therein. The plates 161 on their inner edges are provided with relatively fixed sheets of leather or the like 161ª which directly engage the edges of the printing plate 160. On opposite sides of the aperture 159, the plate-engaging edges of the clamping plates 161 and the associated leather sheets 161ª are beveled as shown in Fig. 15 so that they securely retain the correspondingly formed edges of the printing plate in position. As illustrated in Figs. 1 and 20, the opening 159 in the holder 34 is oblong in shape to receive a correspondingly shaped printing plate 160 but it may be constructed as shown in Fig. 21, where the holder 34ª is shown as having an opening 159ª therein which is more nearly square in form and which is adapted to accommodate a printing plate 160 of lesser area than the one which fits the holder 34 shown in Fig. 20. The holders 34 and 34ª are, however, of the same external dimensions and the dowel holes 157 and 157ª thereof are equally spaced so that one holder may be substituted for the other and will fit the opening 150 to form an air-tight seal with the flange or gasket 153 while at the same time the dowel holes of any such holder will engage the dowel pins 158 to position the holder accurately on the cover plate. Although only two holders have been illustrated, it will be understood that any desired number may be used with a particular machine having openings 159 therein of any desired shape or dimensions. By this arrangement, a wide range of sizes of printing plates may be employed in a single machine by the substitution of different holders 34 which are alike in construction and external dimensions except that the openings 159 therein are of different sizes or shapes and these holders may be turned through angles of ninety or one hundred and eighty degrees to position the subject carried by the printing plate at any desired angle with respect to the surface of the sensitized plate. Before the holder 34 is placed on the cover plate 35, the printing plate 160 is positioned therein by a suitable registering device so that the image or part-image carried by the printing plate is located accurately with respect to the cover plate 35 and the machine on which it is mounted, and other images or designs, which may or may not form the parts of a multi-color subject, are similarly accurately positioned so that in the case of a multi-color job, they will register properly with each other in the finished work printed from the press plates.

In order to form an air seal between the outer portion of the printing plate 160 and the surrounding portion of the plate 153 of the holder, a sealing frame 166 is provided. This frame is of rectangular outline corresponding to the shape of the printing plate and comprises four metallic frame members 167 which are flexibly connected at their ends as shown at 168 in Fig. 1, to form a supporting frame to which is secured a channel-shaped rubber sealing member 169 having a downwardly extending rubber flange 170 engaging the upper surface of the printing plate 160 and another downwardly extending flange 171 which engages the upper surface of the plate 153, thus bridging the opening between the edge of the printing plate and the margin of the opening 159 in the holder so that an air-tight seal is established between the printing plate and the holder while the channel 172 between the flanges 170 and 171 provides space to accommodate the adjusting devices 162 and 163 by which the clamps 161 are manipulated. Channel-shaped metal members 173 are preferably fitted into each wall of the channel-shaped sealing member 169 and are secured through the web of the member 169 into the frame members 167. The sealing frame 166 thus has some flexibility at its corners so that it may adjust itself to any irregularities in the surface contour or thickness of the printing plate while maintaining a continuous annular seal between the edges of the printing plate and the holder 34. In order to prevent accidental removal of the sealing frame 166 from its proper position, as shown in Figs. 15 and 16, guide members 174 are secured to the upper side of the plate 154, around the inner edge thereof, by means of screws 175. These guide members extend around the lateral sides of the sealing frame and form a rectangular recess which is loosely engaged by the sealing frame when in position on the holder. The flanges 170 and 171 are preferably grooved longitudinally along their lower edges as shown at 176 in Fig. 15 but when the cover plate 35 is moved downwardly into engagement with the sealing member 110 carried by the sensitized plate carrier, and a vacuum is established within the chamber occupied by the sensitized plate 135, the sealing members 170 and 171 are adapted to be compressed by the action of the atmospheric pressure and the grooves 176 then substantially disappear as shown in Fig. 16. From the foregoing description it will be apparent that with a seal established between the printing plate and the holder by the sealing frame 166 and another seal established between the cover plate 35 and the sealing flange 110 of the sensitized plate carrier, a closed chamber is established when the cover plate 35 is in its lower position, so that the air may be exhausted therefrom through the conduit 119. In order to facilitate the flow of air from the region of the printing plate and the sensitized plate to the channel 116, located within the sealing flange 110, the under surface of the plate 153 is preferably provided with a series of outwardly extending grooves 177, as shown particularly in Fig. 22. The plates 153 of the holders are preferably of the same thickness as the plate 35 and the parts are so arranged that the lower surfaces of the printing plate 160, plate 153 and cover plate 35 occupy the same horizontal plane as shown in Figs. 15 and 16.

In order to permit adjustment of the sensitized plate in a horizontal plane when the cover plate 35 is in its normal horizontal position, means are provided for elevating the cover plate slightly from its lower operative position, shown in Fig. 9, to the slightly elevated position shown in Fig. 8, thus permitting movement of the sensitized plate without injuring either sensitized plate or the printing plate. The cover plate 35 is guided in its vertical movement by the interlocking parts of the hinges 141 and by the engagement of the dowel pin 142 with the aperture 143. The vertical movement is effected by a pair of lifting bars 180 which are mounted parallel to, and on the inner side of, the upper parts of the side frame members 36, as shown particularly in Fig. 3. The upper edge surfaces of the bars 180 occupy horizontal planes at all times and are adapted to contact directly with the under surface of the cover plate 35 so that the latter may be raised and lowered without disturbing its horizontal arrangement. As shown particularly in Fig. 8, each bar 180 is guided at each end thereof by means of a pin 181 which is secured in fixed position therein and which engages a slot 182 formed in one of the upright guide members 183. These guide members are secured to bosses formed on the side frame members 36, as shown in Fig. 3, and the slots 182 are open at their upper ends to permit the lifting bars 180 to be withdrawn for purposes of repair or the like. The pins 181 have their ends enlarged on the sides of the guide members 183 opposite the bars 180, as shown at 181ª, so that the bars are retained against lateral displacement with respect to the guide members. The movement of the bars 181 with respect to their guides is effected by certain link mechanism comprising a pair of links 184 and a longitudinal actuating bar 185, at each side of the machine. The links 184 are pivoted at 186 on the side frame members and the upper end of each link has a pin 187 mounted therein to engage a horizontal longitudinal slot 188 in the adjacent lifting bar 180 and to form, in addition, a pivotal connection with one end of the adjacent actuating bar 185. The movement of each bar 185 longitudinally thus effects a pivotal movement of the two connected links 184 and at the same time causes the pins 187 to travel in the slots 188 so that the connected bar 180 is compelled to move vertically with respect to the guide slots 182. The longitudinal movement of the actuating bars 185 is brought about by the rotary movement of a shaft 190 which is journaled in bearings carried by the front and rear side frame members 36 and which has a crank arm 191 secured thereon adjacent each side frame member. The outer end of each crank arm 191 is pivotally connected to a rod 192 which has its other end connected to an operating lever 193. Each lever is pivoted at 194 on one side of the frame member and the upper end thereof carries a pin 195 which pivotally engages an aperture in the adjacent actuating bar 185 and also slidably engages a horizontal slot 188ª formed in the adjacent lifting bar 180. The angular movement of the shaft 190 thus causes a corresponding angular movement of the levers 193 and these levers impart a longitudinal movement to the bars 185 so that the pins 187 and 195 move in the slots 188 and 188ª to effect a vertical movement of the lifting bars. This angular movement of the shaft 190 is effected by means of a handle 196 which is secured to the outer end of the shaft on the front side of the machine, as shown in Fig. 8. When the handle 196 is in the position shown in Fig. 8, the cover plate 35 and the printing plate holder 34 are elevated to permit movement of the supporting carriage 31 and carrier 32 by the operation of cranks 50 and 83, and when the handle 196 is in the position shown in Fig. 9, the cover plate 35 has been lowered so that the lifting bars 180 are out of immediate contact with it and its lower surface rests freely upon the sealing flanges 110 of the sensitized plate carrier.

In order to prevent the elevation of the cover plate 35 and printing plate carrier 34 when a vacuum, or partial vacuum, exists within the chamber occupied by the sensitized plate, which might result in injury to the plates, in addition to destroying the register of one or both plates, a connection is established between the mechanism for elevating the lifting bars 180 and the means for operating the valve 121 in the suction line. This connecting means comprises a crank arm 197 secured on the shaft 190, at the front side of the machine, and carrying a pin 198 at its outer end which engages a slot 199 formed in a connecting rod 200. The opposite end portion of this connecting rod is bent downwardly as shown at 200ª and the extremity thereof is pivoted at 201 to the outer end of a crank arm 202 which is mounted on the shaft 203 of the valve 121. The shaft 203 of the valve is rotated by a crank handle 204 and when the suction valve 121 is opened, it tends to retain that position under the influence of a coil spring 205 which is connected between the pin 201 and a stationary member 206 carried by the frame 36. The connection between the crank arm 202 and the shaft 203 of the valve is illustrated particularly in Fig. 10, where the shaft is shown as being provided with a transverse pin 207 having the projecting end thereof engaging an angular slot 202ª of the hub of the crank arm so that a limited angular movement of the shaft 203 may be effected without turning the crank arm 202. The extent of angular movement of the shaft 203 is limited by a pair of arms 208 and 209 which are secured on the shaft and which are adapted to engage a stationary stop member 210, carried by the frame, in each of the limiting positions of the shaft shown in Figs. 8 and 9. When the handle 196 has been turned toward the right to elevate the cover plate 35, as shown in Fig. 8, the pin 198 carried by the crank arm 197 engages the extreme left hand end of the slot 199 and thus holds the valve 121 in closed position. When the handle 196 has been thrown to the position shown in Fig. 9, to permit the lifting bars and cover plate to lower, the length of the slot 199 permits the valve 121 to be opened and when this occurs, the crank arm 202 extends substantially horizontally, as shown in Fig. 9, with the bent portion 200ª of the connecting rod 200 extending over the shaft 203 which is then substantially in a line with the pivots 198 and 201 so that the lever 196 is held against movement toward the right while the vacuum valve is open. When the vacuum valve is closed, as shown in Fig. 8, the slot 199 in the connecting rod and the lost motion permitted by the slot 202ª in the hub of the crank arm 202, permit the cover plate 35 to be raised and lowered freely.

The invention has been described above in connection with its use for making metal press plates, such as zinc press plates having a relatively small thickness, for example, twenty-five thousandths of an inch or less, for use on offset printing presses, and although this arrangement of apparatus may be employed for making photographic negatives on thin transparent sheets and the like, the machine will ordinarily require some modification to adapt it for use in the manufacture of glass negatives having a considerable thickness. This modification of the machine is illustrated in Figs. 24, 25, 26 and 27, wherein the structure is the same as that illustrated in Figs. 1 to 23, inclusive, except that the holder for supporting the sensitized plate is modified to receive a sensitized plate of greater thickness. The principal parts of the machine illustrated in Figs. 24 to 27, inclusive, have therefore been lettered with the same numerals as those employed in describing the first mentioned use of the invention and the present description will be confined largely to those parts which are modified or changed. This modification lies chiefly in the tray 215 which corresponds to the tray or holder 125 previously described. This tray comprises a metal plate 216 having a rectangular opening 217 therein and having a rather thin flexible rubber sheet 218 secured to the bottom thereof to form a bottom wall for the recess 217 in which the sensitized glass plate is adapted to be located. The opposite sides of the plate 216 and the corresponding portions of the plate 218 are provided with dowel holes 219 which are adapted to be engaged by the dowel pins 127 when the tray is positioned on the carrier of the machine, as shown in Figs. 26 and 27. When so positioned, the rubber sheet 218 of the tray 215 rests on the rubber blanket 103 and the tray is free to move upwardly under the influence of atmospheric pressure from below when a vacuum is created in the chamber in which the tray is located. The recess 217 is adapted to contain the sensitized glass plate 220 to which the images or part-images carried by the printing plate 160 are to be transferred by the action of light. This printing plate is seated in the recess 217 and bears against the rightangular edges of that recess while the outer side thereof is engaged by clamps 221 which are adjustably mounted on bars 222 by means of screws 223 which engage the bars and elongated slots in the clamping members. The recess 217 is shaped on two sides to receive the bars 222 having inclined ends 222ª and when these bars have been dropped into place, the clamping members 223 may be adjusted against two rightangular edges of the plate 220 in order to secure this plate in predetermined position within the tray 215. When thus positioned, the sensitized glass plate occupies a definite position in the machine and is adapted to have reproduced thereon one or a plurality of images 225 which are transferred thereto from the printing plate 160. In order to accommodate different thicknesses of glass plate 225, one or more sheets 226 of rubber or other flexible material may be placed, if necessary, in the bottom of the recess 217 between the rubber bottom plate 218 and the sensitized glass plate 225, as illustrated in Figs. 26 and 27. When a vacuum is created in the chamber occupied by the tray 215, the rubber blanket 103, which forms the bottom wall of the vacuum chamber, is adapted to push the tray upwardly on the dowel pins and also to effect some upward movement of that portion of the rubber sheet 218 which lies beneath the sensitized plate, so that the sensitized plate and the printing plate are forced into close and uniform contact with a pressure depending on the degree of vacuum, but which is preferably from ten to fourteen pounds per square inch. In effecting this transfer photographically by the action of light, an artificial source of light of relatively high candle power is preferably employed so that the exposure may be made in a comparatively limited time, for example, two minutes or less, but such sources are well known to those skilled in the art and have not been illustrated in the drawings. Such a light source may be moved into position over the cover plate 35 after it has been lowered into horizontal position above the frame of the machine and it may be elevated out of the way after the exposure has been made and the operator desires to elevate the cover plate 35 to permit access to the holder for the sensitized plate.

With the use of the invention for making press plates, as illustrated in Figs. 1 to 23, inclusive, or for making negatives, as illustrated in Figs. 24 to 27, inclusive, the sensitized plate whether it be a thin sheet or film, or a relatively thick glass plate, is first secured within or upon the tray 125 or 215 and this tray is then positioned upon the sensitized plate carrier by causing the dowel pins 127 to engage two opposite apertures therein. The crank handle 50 is then turned to effect the desired adjustment of the carriage 31 longitudinally of the machine, as indicated by the micrometer scales 64 and 66. If necessary, the crank handle 83 may be adjusted also to effect a desired movement of the supporting member 32 transversely of the machine, as indicated by the scales 93 and 98. Assuming that a printing plate holder 34, with a printing plate in registered position therein, has previously been prepared in readiness for the work to be performed, the cover plate 35 is lowered into the horizontal position shown in Figs. 8, 13 and 14 and, after detaching the chains 147 from the cover plate, the printing plate holder 34 is placed in position on the dowel pins 158 of the cover plate, and a sealing frame 166, of the proper size, is placed in position to seal the gap between the printing plate and the holder, as shown in Fig. 15. The parts are then in the position shown in Figs. 8 and 15 or Fig. 26, and the operator then throws the handle 196 from the position shown in Fig. 8 to the position shown in Fig. 9, which allows the cover plate 35 to move downwardly until its lower surface engages the sealing rim 110 of the sensitized plate carrier to form a sealed chamber from which the air may be withdrawn by suction. The operator then turns the handle 204 to open the suction valve which results in exhausting the air from the chamber occupied by the tray 125 (or 215) which carries the sensitized plate. Upon the formation of a more or less perfect vacuum in this chamber, the sealing member 110 is compressed as shown in Fig. 16, or Fig. 27, and similar compression is effected of the sealing flanges 170 and 171 of the sealing frame 166, due to the action of atmospheric pressure pushing the cover, the printing plate holder and the sealing frame downwardly. At the same time, the atmospheric pressure which has free access to the under side of the rubber blanket 103 through the passages 106 and grooves 107 forces the blanket 103 upwardly as shown in Figs. 16 and 27, so that the sensitized plate is forced upwardly against the printing plate 160 at the same time that the printing plate is acted upon in a downward direction by the atmospheric pressure above it. The result of these opposed pressures of the atmosphere on opposite walls of the vacuum chamber within which the tray carrying the sensitized plate is mounted in a position to move freely in a vertical direction on the dowel pin 127, is that a more perfect contact is obtained between the printing plate and the sensitized plate than has heretofore been possible and this pressure is substantially uniform over each unit of area of the contacting plates so that the design arranged to be reproduced is recorded accurately and clearly upon all parts of the sensitized plate covered thereby. When one exposure has been made, the crank handle 204 is turned to shut off the suction line, at the same time establishing an opening to the atmosphere so that atmospheric pressure may again enter the chamber previously evacuated. When this has been done, the operator turns the handle 196 from the position shown in Fig. 9 to that illustrated in Fig. 8, thus elevating the cover plate 35 and the negative holder 34 so that the operator is again permitted to adjust the crank handles 50 and 83 to locate a different portion of the sensitized plate in position to receive an impression to be transferred thereto from the printing plate. When the sensitized plate has thus been positioned, the cover plate is again lowered and the valve in the suction line is again opened to establish a close contact between the printing plate and a negative preliminary to making an exposure by the action of an artificial light which may be moved into position above the printing plate for that purpose.

Although one form of machine embodying the invention, and a modification of a portion thereof, have been illustrated and described by way of example, it will be understood that the invention may be practiced in various ways and embodied in various forms of construction within the scope of the appended claims.

I claim:

1. The method of transferring a subject from a printing plate to a sensitized plate which consists in enclosing said sensitized plate entirely within a chamber having said printing plate forming a wall thereof opposite said sensitized plate, exhausting the air from said chamber, and then causing light to pass through said printing plate to said sensitized plate.

2. The method of transferring a subject from a printing plate to a sensitized plate and repeating it in a plurality of positions on said sensitized plate which consists in enclosing said sensitized plate entirely within a chamber having a printing plate forming a wall thereof opposite said sensitized plate, exhausting the air from said chamber, causing light to pass through said printing plate to said sensitized plate, then effecting relative adjustment of parts of said chamber to position said printing plate opposite another portion of said sensitized plate, then exhausting the air again, and then again causing the light to pass through said printing plate to said sensitized plate.

3. The method of securing close contact between a sensitized plate and a printing plate in a photo-composing machine which consists in enclosing one of said plates in a chamber having the other plate forming one wall thereof opposite said first named plate and having a flexible wall on the side of said first named plate opposite said second named plate, said flexible will being free of connection with said first-named plate, and then exhausting the air from said chamber to cause said flexible wall and said first named plate to be moved by atmospheric pressure bodily toward said second named plate.

4. The method of transferring a subject from a printing plate to a sensitized plate which consists in locating said sensitized plate accurately within a chamber having a flexible wall on one side of said sensitized plate and having said printing plate forming a wall of said chamber on the other side of said sensitized plate, then exhausting the air from said chamber, and then causing light to pass through said printing plate to said sensitized plate.

5. The combination in a photo-composing machine, of means for supporting a sensitized plate, means for supporting a printing plate, means for forming a vacuum chamber having said sensitized plate entirely enclosed therein, and means for effecting relative adjustments of said supporting means to position different portions of one plate opposite the other plate.

6. The combination in a photo-composing machine, of means for supporting a sensitized plate, means for supporting a printing plate, means for forming a vacuum chamber having one of said plates enclosed entirely therein and having a flexible wall back of but free of connection with said enclosed plate, means for exhausting the air from said chamber, and means for effecting relative adjustments of said supporting means to position different portions of one plate opposite the other plate.

7. The combination in a photo-composing machine, of means for supporting a sensitized plate, means for supporting a printing plate, means associated with said supporting means for forming a vacuum chamber having one of said plates enclosed entirely within said chamber and free to move toward the other of said plates, said other plate forming a wall of said chamber, means for exhausting the air from said chamber, means for separating said supporting means, and means for effecting relative adjustment of said supporting means parallel to the surfaces of said plates after said supporting means have been separated.

8. The combination in a photo-composing machine, of a sensitized plate carrier having a flexible wall surrounded by a sealing member, means for supporting a sensitized plate on said carrier opposite said flexible wall, a cover plate adapted to engage said sealing member to form a closed chamber, a printing plate carried by said cover plate, and means for exhausting the air from said chamber.

9. The combination in a photo-composing machine, of a sensitized plate carrier having a flexible wall surrounded by an endless sealing member, means for supporting a sensitized plate on said carrier opposite said wall within said sealing member, a cover plate movable toward and from said carrier and having an aperture therein, means for supporting a printing plate in said aperture, means for forming an air seal between said printing plate and said cover plate, and means for exhausting the air from the chamber formed by the engagement of said cover plate with said sealing member.

10. The combination in a photo-composing machine, of a sensitized plate carrier having an endless sealing member mounted thereon, means for mounting a sensitized plate on said carrier within said sealing member, a cover plate movable into engagement with said sealing member and having an aperture therein, a printing plate mounted on said cover plate within said aperture, and means for forming an endless air seal between the edges of said printing plate and the surrounding part of said cover plate.

11. The combination in a photo-composing machine, of a sensitized plate carrier having an endless sealing member mounted thereon, means for mounting a sensitized plate on said carrier within said sealing member, a cover plate movable into engagement with said sealing member and having an aperture therein, a printing plate mounted on said cover plate within said aperture, means for forming an endless air seal between the edges of said printing plate and the surrounding part of said cover plate, means for effecting relative movement of said carrier and said cover plate toward and from each other, and means for exhausting the air from the region within said sealing member when said sealing member is in engagement with said cover plate.

12. The combination in a photo-composing machine, of a carrier having a perforated wall, a flexible non-porous blanket mounted on said carrier opposite said wall, a resilient sealing member extending around said carrier, means for positioning a sensitized plate on said carrier opposite said flexible blanket to permit movement thereof transversely to the plane of said blanket, a cover plate engaging said sealing member and having a printing plate mounted therein, and means for forming an air seal between said printing plate and said cover plate.

13. The combination of a photo-composing machine, of a sensitized plate carrier, an endless sealing member extending around said sensitized plate on said carrier, a cover plate adapted to engage said sealing member and having a printing plate mounted therein, means for forming an air seal between said printing plate and said cover plate, means for exhausting the air from the chamber formed when said cover plate is in engagement with said sealing member, means for effecting a relative separation of said cover plate and said carrier, and means for effecting relative adjustments of said cover plate and said carrier parallel to the plane of said sensitized plate.

14. The combination in a photo-composing machine, of a sensitized plate carrier, an endless sealing member extending around said sensitized plate on said carrier, a cover plate adapted to engage said sealing member and having a printing plate mounted therein, means for forming an air seal between said printing plate and said cover plate, means for exhausting the air from the chamber formed when said cover plate is in engagement with said sealing member, means for effecting a relative separation of said cover plate and said carrier, a carriage on which said carrier is mounted, means for moving said carrier on said carriage when said carrier and said cover plate have been separated, and means for adjusting said carriage transversely to the direction of movement of said carrier.

15. The combination in a photo-composing machine, of a frame, a carrier for a sensitized plate mounted for movement on said frame, a cover plate having an aperture therein to receive a printing plate in registry therewith, a continuous sealing member mounted on said carrier and extending around the sensitized plate thereon, said cover plate being of sufficient area to engage said sealing member in all of the positions of said carrier, and means for effecting relative movement of said carrier and said cover plate toward and from each other.

16. The combination in a photo-composing machine, of a frame, a carriage movably mounted on said frame, a sensitized plate carrier adjustably mounted on said carriage to move transversely to the path of movement of said carriage, a continuous sealing member mounted on said carrier to extend around the sensitized plate thereon, a cover plate having an aperture therein to receive a printing plate, said cover plate being of sufficient area to engage said sealing member in all positions of said carrier and said carriage, and means for effecting relative adjustment of said carrier and said cover plate toward and from each other.

17. The combination in a photo-composing machine, of a frame, a carrier adjustably mounted on said frame, a tray for carrying a sensitized plate, means for accurately positioning said tray on said carrier, and a continuous sealing member mounted on said carrier and extending around said tray.

18. The combination in a photo-composing machine, of a frame, a carrier adjustably mounted on said frame, a non-porous flexible member mounted on said carrier, a tray for carrying a sensitized plate, and means for accurately positioning said tray on said carrier and permitting movement thereof with said non-porous flexible member transversely to the plane of said carrier.

19. The combination in a photo-composing machine, of a frame, a carrier adjustably mounted on said frame, a non-porous flexible member mounted on said carrier, a tray for carrying a sensitized plate, means for accurately positioning said tray on said carrier and permitting movement thereof with said non-porous flexible member transversely to the plane of said carrier, a continuous sealing member mounted on said carrier around said blanket and said tray, a cover plate adapted to engage said sealing member, and means carried by said cover plate for supporting the printing plate.

20. The combination in a photo-composing machine, of a frame, a carrier mounted on said frame, said carrier comprising a flat plate having two series of apertures therein connected by grooves in the upper sides of said plate, a flexible blanket secured to the upper side of said plate around its outer edges and having the intermediate portion thereof located over said grooves, means for positioning a sensitized plate on said carrier above said blanket and permitting movement thereof away from said plate, a cover plate, and means for forming an air seal between said cover plate and said carrier around said sensitized plate.

21. The combination in a photo-composing machine, of a frame, a carrier mounted on said frame, said carrier comprising a flat plate having two series of apertures therein connected by grooves in the upper sides of said plate, a flexible blanket secured to the upper side of said plate around its outer edges and having the intermediate portion thereof located over said grooves, means for positioning a sensitized plate on said carrier above said blanket and permitting movement thereof away from said plate, a cover plate having an aperture therein, means for mounting a printing plate in register with said aperture and forming an air seal between said printing plate and said cover plate, means for forming an air seal between said cover plate and said carrier around said sensitized plate, and means for exhausting the air from the region within said last named air seal occupied by said sensitized plate.

22. The combination in a photo-composing machine, of a frame, a carrier mounted on said frame, a flexible blanket mounted on said carrier, said carrier having means for permitting access of atmospheric air to the under side of said blanket, a pair of dowel pins extending upwardly from said carrier above said blanket, a tray having apertures forming a sliding engagement with said dowel pins, and means for mounting a sensitized plate on said tray.

23. The combination in a photo-composing machine, of a frame, a carrier mounted on said frame, a flexible blanket mounted on said carrier, said carrier having means for permitting access of atmospheric air to the under side of said blanket, a pair of dowel pins extending upwardly from said carrier above said blanket, a tray having apertures forming a sliding engagement with said dowel pins, means for mounting a sensitized plate on said tray, a cover plate adapted to carry a printing plate, and an endless sealing member surrounding said sensitized plate on said carrier and adapted to engage the under side of said cover plate.

24. The combination in a photo-composing machine, of a frame, a carrier mounted on said frame, a flexible blanket mounted on said carrier, said carrier having means for permitting access of atmospheric air to the under side of said blanket, a pair of dowel pins extending upwardly from said carrier above said blanket, a tray having apertures forming a sliding engagement with said dowel pins, means for mounting a sensitized plate on said tray, a cover plate adapted to carry a printing plate, an endless sealing member surrounding said sensitized plate on said carrier and adapted to engage the under side of said cover plate, means for effecting relative separation of said carrier and said cover plate, and means for effecting relative adjustment of said carrier and said cover plate parallel to the plane of said sensitized plate after said separation has been effected.

25. The combination in a photo-composing machine, of a frame, a sensitized plate carrier mounted on said frame, an endless sealing member mounted on said carrier around the sensitized plate thereon, a cover plate, means for moving said cover plate through a limited range of movement toward and from said carrier, and means for guiding said cover plate during said limited movement and for supporting said cover plate during a larger range of movement away from said carrier.

26. The combination in a photo-composing machine, of a frame, a sensitized plate carrier mounted on said frame, an endless sealing member mounted on said carrier around the sensitized plate thereon, a cover plate, means for moving said cover plate through a limited range of movement toward and from said carrier, and means carried by said frame and slidably engaging parts of said cover plate for holding said cover plate in registered position and permitting said limited movement thereof.

27. The combination in a photo-composing machine, of a frame, a sensitized plate carrier mounted on said frame, an endless sealing member mounted on said carrier around the sensitized plate thereon, a cover plate, means for moving said cover plate through a limited range of movement toward and from said carrier, and a pair of hinges connected with one side of said cover plate to permit the swinging movement thereof away from said carrier, said hinges being adapted to permit said limited movement of said cover plate when it occupies a position parallel to said carrier.

28. The combination in a photo-composing machine, of a frame, a sensitized plate carrier mounted on said frame, an endless sealing member mounted on said carrier around the sensitized plate thereon, a cover plate, means for moving said cover plate through a limited range of movement toward and from said carrier, a pair of hinges connected with one side of said cover plate to permit the swinging movement thereof away from said carrier, said hinges being adapted to permit said limited movement of said cover plate when it occupies a position parallel to said carrier, and a dowel pin mounted on said frame and engaging said carrier during said limited movement.

29. The combination in a photo-composing machine, of a frame, a sensitized plate carrier adjustably mounted on said frame, a sealing member extending around said sensitized plate on said carrier, a cover plate movably mounted on said frame and adapted to engage said sealing member in all of the positions of said carrier, said cover plate having an aperture therein, and a printing plate holder removably mounted in predetermined position on said cover plate to position a printing plate in registry with said aperture.

30. The combination in a photo-composing machine, of a frame, a sensitized plate carrier adjustably mounted on said frame, a sealing member extending around said sensitized plate on said carrier, a cover plate movably mounted on said frame and adapted to engage said sealing member in all of the positions of said carrier, said cover plate having an aperture therein, a printing plate holder removably mounted in predetermined position on said cover plate to position a printing plate in registry with said aperture, and an endless sealing member surrounding said aperture to form an air seal between said holder and said cover plate.

31. The combination in a photo-composing machine, of a frame, a sensitized plate carrier adjustably mounted on said frame, a cover plate of larger area than said carrier and having an aperture therein, means for adjusting said carrier to position different parts of a sensitized plate beneath said aperture, and a plurality of interchangeable printing plate holders arranged to fit said aperture and having printing plate receiving openings therein of different sizes.

32. The combination in a photo-composing machine, of a frame, a sensitized plate carrier adjustably mounted on said frame, a cover plate of larger area than said carrier and having an aperture therein, means for adjusting said carrier to position different parts of a sensitized plate beneath said aperture, a plurality of interchangeable printing plate holders arranged to fit said aperture and having printing plate receiving openings therein of different sizes, an endless sealing member carried by said cover plate around said aperture to form an air seal with any one of said holders, and means to form an endless air seal between each of said holders and the outer portions of the printing plate mounted therein.

33. The combination in a photo-composing machine, of a printing plate support comprising a hinged cover plate having an aperture therein, a printing plate holder mounted in said aperture, means for forming an endless air seal between said holder and said cover plate, and means for forming an endless air seal between the outer portions of said printing plate and said holder.

34. The combination in a photo-composing machine, of a frame, a sensitized plate carrier adjustably mounted on said frame, a sealing member extending around said sensitized plate on said carrier, a cover plate movably mounted on said frame and adapted to engage said sealing member in all of the positions of said carrier, said cover plate having an aperture therein, a printing plate holder removably mounted in predetermined position on said cover plate to position a printing plate in registry with said aperture, and a sealing frame forming a continuous endless air seal between the outer edge portions of said printing plate and a surrounding portion of said holder.

35. The combination in a photo-composing machine, of a frame, a sensitized plate carrier adjustably mounted on said frame, a sealing member extending around said sensitized plate on said carrier, a cover plate movably mounted on said frame and adapted to engage said sealing member in all of the positions of said carrier, said cover plate having an aperture therein, a printing plate holder removably mounted in predetermined position on said cover plate to position a printing plate in registry with said aperture, a sealing frame forming a continuous endless air seal between the outer edge portions of said printing plate and the surrounding portion of said holder, means for forming a continuous endless air seal between the outer portion of said printing plate and said holder, and means for positioning said sealing frame accurately in position on said cover plate.

36. The combination in a photo-composing machine, of a frame, a sensitized plate carrier adjustably mounted on said frame, a sealing member extending around said sensitized plate on said carrier, a cover plate movably mounted on said frame and adapted to engage said sealing member in all of the positions of said carrier, said cover plate having an aperture therein, a printing plate holder removably mounted in predetermined position on said cover plate to position a printing plate in registry with said aperture, air sealing means comprising an endless sealing flange engaging said printing plate and another endless sealing flange engaging said holder, and means forming an endless air seal between said holder and said cover plate.

37. The combination in a photo-composing machine, of a frame, a sensitized plate carrier movably mounted on said frame to position said sensitized plate in different locations, a cover plate mounted on said frame opposite said carrier and having a centrally located aperture therein opposite which different portions of said sensitized plate are adapted to be positioned by the movement of said carrier, dowel pins mounted on said cover plate adjacent said aperture, and a plurality of printing plate holders each having dowel holes adapted to be engaged by said dowel pins and having parts arranged to fit said aperture, said printing plate holders having openings therein for receiving printing plates of different sizes and having adjustable means for securing said printing plates in said openings.

38. The combination in a photo-composing machine, of a frame, a sensitized plate carrier movably mounted on said frame, a flat cover plate of larger area than said carrier and having an aperture therein, means for mounting a printing plate in said aperture, sealing means mounted on said carrier to engage said cover plate around said aperture in all of the positions of said carrier, a pair of bars adapted to engage said cover plate, and means for actuating said bars to move said cover plate away from said carrier to permit movement of said carrier.

39. The combination in a photo-composing machine, of a frame, a sensitized plate carrier movably mounted on said frame, a flat cover plate of larger area than said carrier and having an aperture therein, means for mounting a printing plate in said aperture, sealing means mounted on said carrier to engage said cover plate around said aperture in all of the positions of said carrier, a pair of bars adapted to engage said cover plate, means for actuating said bars to move said cover plate away from said carrier to permit movement of said carrier, means for exhausting the air from the region within said sealing member when said sealing member is engaged by said cover plate, a valve for controlling said exhausting means, and an interconnection between said valve and said actuating means for preventing the separation of said carrier and said cover plate when said exhausting means is in operation.

40. The combination in a photo-composing machine, of a frame, a carrier slidably mounted on said frame, means comprising a screw threaded shaft engaging said frame and said carrier for effecting adjustment thereof, a counterweighted flexible member connected to said carrier, a rotary member engaging said flexible member for actuation thereby upon movement of said carrier, and an indicator operated by said rotary member.

41. The combination in a photo-composing machine, of a frame, a carrier slidably mounted on said frame, means comprising a screw threaded shaft engaging said frame and said carrier for effecting adjustment thereof, a counterweighted flexible member connected to said carrier, a rotary member engaging said flexible member for actuation thereby upon movement of said carrier, an indicator operated by said rotary member, and additional indicating means associated with said shaft for indicating partial revolutions thereof.

42. The combination in a photo-composing machine, of a sensitized plate carrier, a sensitized plate holder mounted on said carrier and having a recess therein, and means for securing a sensitized plate in said recess.

43. The combination in a photo-composing machine, of a sensitized plate carrier, a sensitized plate holder mounted on said carrier and having a recess therein provided with a flexible wall, and means for adjustably securing a sensitized plate in said recess opposite said flexible wall.

44. The combination in a photo-composing machine, of a sensitized plate carrier having a flexible wall, a sensitized plate holder positioned on said carrier in contact with said flexible wall, said holder having a recess therein provided with a flexible wall arranged to contact with the flexible wall of said carrier, and means for adjustably securing a printing plate in said recess parallel to the flexible wall of said holder.

45. The combination in a photo-composing machine, of a sensitized plate carrier having a flexible wall, a sensitized plate holder positioned on said carrier in contact with said flexible wall, said holder having a recess therein provided with a flexible wall arranged to contact with the flexible wall of said carrier, means for adjustably securing a printing plate in said recess parallel to the flexible wall of said holder, and flexible spacing means interposed between the sensitized plate and said flexible wall of said holder.

46. The combination in a photo-composing machine, of a sensitized plate carrier having a flexible wall, a sensitized plate holder positioned on said carrier in contact with said flexible wall, said holder having a recess therein provided with a flexible wall arranged to contact with the flexible wall of said carrier, means for adjustably securing a printing plate in said recess parallel to the flexible wall of said holder, an endless sealing member mounted on said carrier, a cover plate adapted to engage said sealing member and having means for positioning a printing plate opposite said sensitized plate, and means for exhausting the air from the chamber formed by the engagement of said sealing member with said cover plate.

In testimony whereof, I have subscribed my name.

ALEXANDER T. KOPPE.